(12) United States Patent
Roediger et al.

(10) Patent No.: US 6,772,414 B1
(45) Date of Patent: Aug. 3, 2004

(54) LIFETIME-SENSITIVE MECHANISM AND METHOD FOR HOISTING INVARIANT COMPUTATIONS OUT OF LOOPS IN A COMPUTER PROGRAM

(75) Inventors: Robert Ralph Roediger, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 09/099,584

(22) Filed: Jun. 18, 1998

(51) Int. Cl.$^7$ ................................................ G06F 9/45
(52) U.S. Cl. ........................ 717/160; 717/150; 717/156
(58) Field of Search ............................... 717/140, 146, 717/149–161

(56) References Cited

PUBLICATIONS

Aho et al., "Compiler, Principles, Techniques, and Tools", Addison–Wesley Publishing, pp. 1–5, 585–645, Mar. 1988.*
Gupta, "Code Optimization as a Side Effect of Instruction Scheduling", IEEE, pp. 370–377, Dec. 1997.*
Knoop et al., "The Power of Assignment Motion", ACM, pp. 233–245, Jun. 1995.*
Knoop et al., "Partial Dead Code Elimination", ACM, pp. 147–158, Jun. 1994.*

* cited by examiner

Primary Examiner—Tuan Dam
Assistant Examiner—Ted T. Vo
(74) Attorney, Agent, or Firm—Martin & Associates LLC; Derek P. Martin

(57) ABSTRACT

A mechanism and method for hoisting invariant computations from loops analyzes the lifetimes of fixed processor resources defined by an instruction, and determines whether a group of computations present in multiple instructions within the lifetime are, taken together, loop-invariant and legal to hoist from the loop. If the group of computations within the lifetime of the fixed processor resource are loop-invariant and hoistable, all of the computations are hoisted out of the loop as a group. By determining the lifetimes of fixed processor resources defined in an instruction, the hoisting mechanism succeeds in hoisting out groups of computations that cannot be individually hoisted out of a loop, thereby achieving better performance when the computer program executes.

15 Claims, 8 Drawing Sheets

700

705 —— Calculate liveness for all bottleneck registers (BRs)
710 —— Calculate def-use and use-def chains for all BRs
715 —— For each appropriate loop in the relevant range from inner to outer:
720 —— For each candidate instruction I in the loop:
    725 —— If I is loop-invariant and has no side effects on any BR, then hoist it out
    730 —— If I is loop-invariant but has a side effect on a BR, then:
        735 —— Use I's def-use chains to find reached uses of BR from I
        740 —— If BR is live on entry to loop, reject I
        745 —— If any reached use is outside the loop containing I, reject I
        750 —— If any reached use is reached by a definition other than I, reject I
        755 —— If any reached use is not loop-invariant (ignoring definitions from I), reject I
        760 —— Repeat analysis for any BRs defined on any reached use
        765 —— Otherwise, hoist I and all of its uses out of the loop 410 — For each appropriate loop in the program from inner to outer:
420 ——— For each candidate instruction I in the loop:
430 ——————— If I is loop-invariant and hoistable, then hoist it out 705 —— Calculate liveness for all bottleneck registers (BRs)
710 —— Calculate def-use and use-def chains for all BRs
715 —— For each appropriate loop in the relevant range from inner to outer:
720 —— For each candidate instruction I in the loop:
　　725 —— If I is loop-invariant and has no side effects on any BR, then hoist it out
　　730 —— If I is loop-invariant but has a side effect on a BR, then:
　　　　735 —— Use I's def-use chains to find reached uses of BR from I
　　　　740 —— If BR is live on entry to loop, reject I
　　　　745 —— If any reached use is outside the loop containing I, reject I
　　　　750 —— If any reached use is reached by a definition other than I, reject I
　　　　755 —— If any reached use is not loop-invariant (ignoring definitions from I), reject I
　　　　760 —— Repeat analysis for any BRs defined on any reached use
　　　　765 —— Otherwise, hoist I and all of its uses out of the loop

FIG. 7

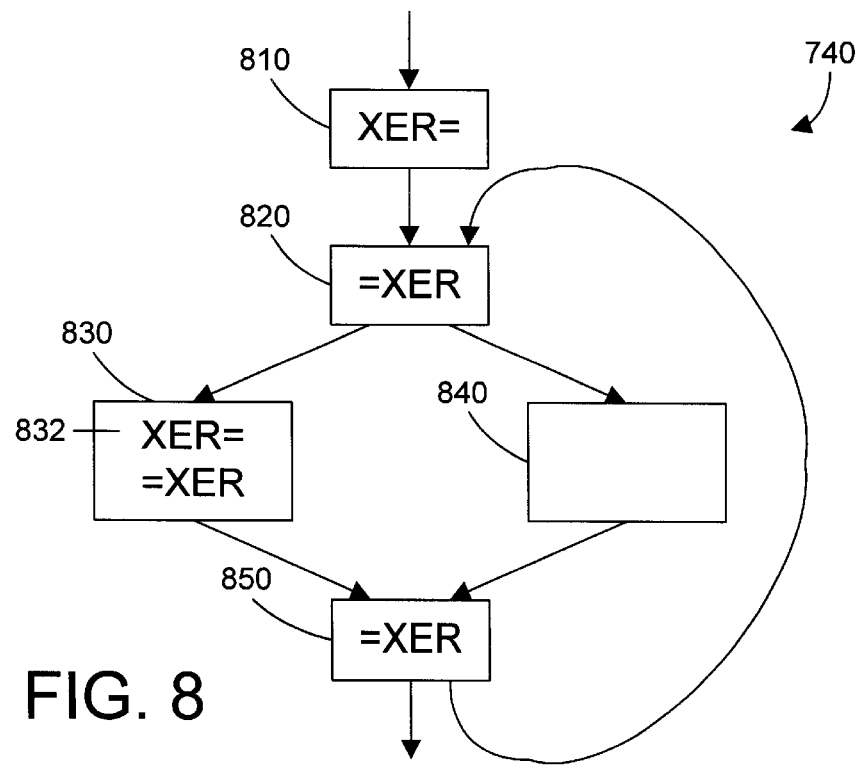

FIG. 8

LIFETIME-SENSITIVE MECHANISM AND METHOD FOR HOISTING INVARIANT COMPUTATIONS OUT OF LOOPS IN A COMPUTER PROGRAM

BACKGROUND OF THE INVENTION

1. Technical Field

This invention generally relates to the optimization of computer programs, and more specifically relates to a computer mechanism and method for optimizing a computer program by hoisting loop-invariant computations out of loops in the computer program.

2. Background Art

The development of the EDVAC computer system in 1948 is generally considered the beginning of the computer era. Since that time, dramatic advances in both hardware and software (e.g., computer programs) have drastically improved the performance of computer systems. Modern software has become very complex when compared to early computer programs. Many modern computer programs execute tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

A computer program of any complexity will contain many loops for repetitively executing a set of instructions until some condition is satisfied. Modern compilers typically include a mechanism for moving computations in a loop outside of the loop if the result of the computation doesn't change within the loop. If the result of a computation doesn't change within the loop, the computation is said to be loop-invariant. The process of moving loop-invariant computations outside of the loop is commonly known in the art as "hoisting". The concept of hoisting computations from loops is well-known, as discussed in Aho et al., *Compilers: Principles, Techniques and Tools*, section 10.7, pp. 638–643 (March 1988). By hoisting loop-invariant computations from within the loop to outside of the loop, the performance of the computer program is enhanced.

Known mechanisms and methods for hoisting loop-invariant computations out of a loop only consider computations one at a time. These mechanisms and methods do not recognize that certain groups of computations, taken together, may be legal and profitable to hoist out of a loop, even though no single computation in the group can be legally hoisted independently. Without an improved mechanism and method for hoisting loop-invariant computations from loops, the computer industry will continue to suffer from computer programs that are not fully optimized.

DISCLOSURE OF INVENTION

According to the present invention, a mechanism and method for hoisting invariant computations from loops analyzes the lifetimes of fixed processor resources defined by an instruction, and determines whether a group of computations present in multiple instructions within the lifetime are, taken together, loop-invariant and legal to hoist from the loop. If the group of computations within the lifetime of the fixed processor resource are loop-invariant and hoistable, all of the computations are hoisted out of the loop as a group. By determining the lifetimes of fixed processor resources defined in an instruction, the hoisting mechanism succeeds in hoisting out groups of computations that cannot be individually hoisted out of a loop, thereby achieving better performance when the computer program executes.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a flow diagram of a method for hoisting computations out of a loop in accordance with a preferred embodiment;

FIG. 8 is a control flow graph showing an example of a program configuration that would violate a hoisting criterion 740 of FIG. 7;

BEST MODE FOR CARRYING OUT THE INVENTION

Figure 1:
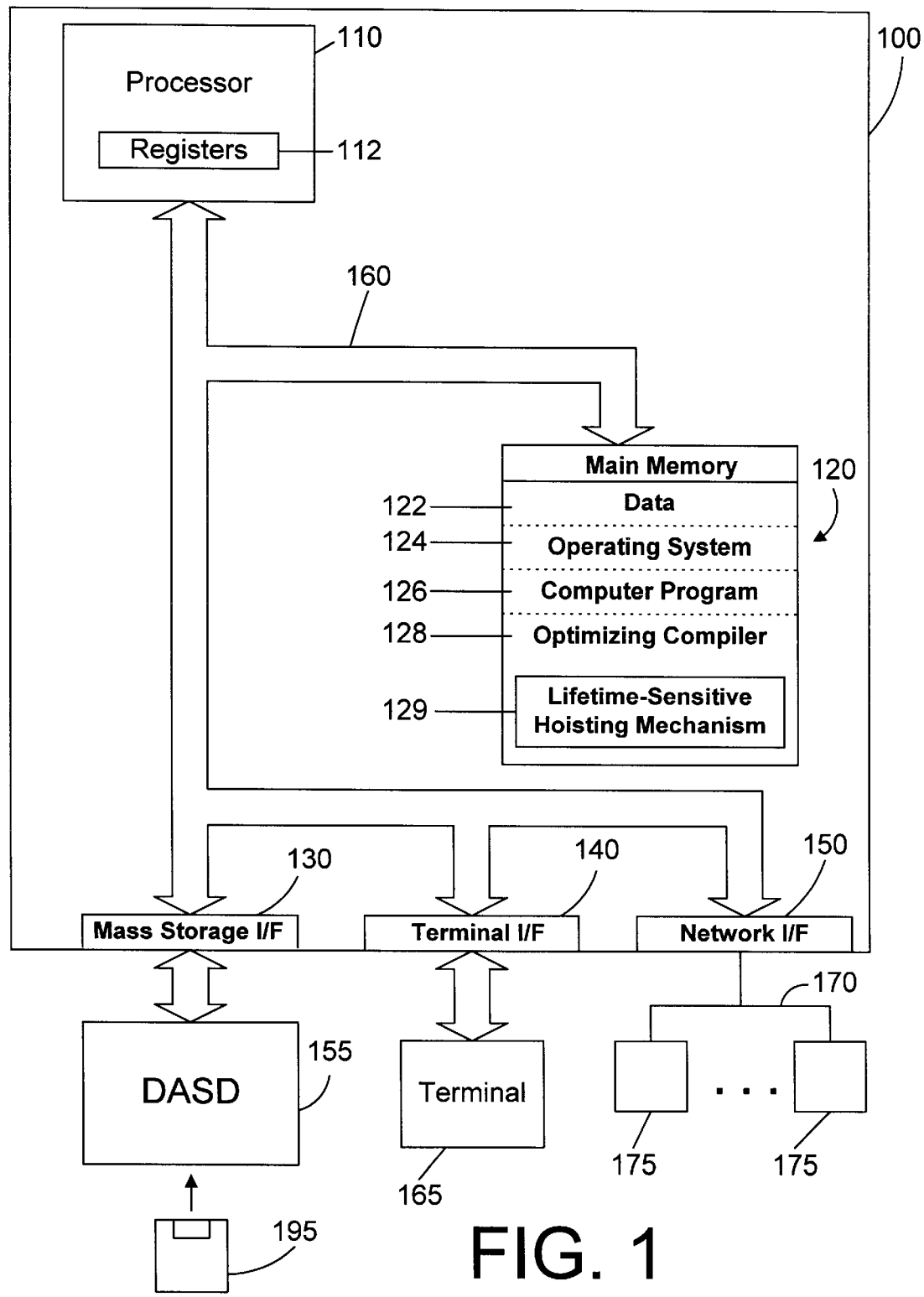
FIG. 1 is a block diagram of an apparatus in accordance with a preferred embodiment of the present invention.

The present invention is used in a programming environment for developing computer programs. For those who are not familiar with compilers and optimization in a programming environment, the brief overview below provides background information that will help the reader to understand the present invention.

1. Overview

Compilers

Computer programs are constructed using one or more programming languages. Like words written in English, a programming language is used to write a series of statements that have particular meaning to the drafter (i.e., the programmer). The programmer first drafts a computer program in human readable form (called source code) prescribed by the programming language, resulting in a source code instruction stream. The programmer then uses mechanisms that change this human readable source code into a machine readable form (machine language program or object code) that can be understood by a computer's processor. This machine readable form, within this specification, is a stream of binary instructions (i.e., ones and zeros) that are meaningful to the computer's processor. Mechanisms for converting source code to machine code are typically called compilers; however, it should be understood that the term "compiler", as used within this specification, generically refers to any mechanism that transforms one representation of a computer program into another representation of that program.

The compiler typically compiles each programming language statement in the source code into one or more machine language instructions in the resulting object code. This is usually a two step process, with the first step performed by the compiler "front end" and the second step performed by the compiler "back end". The front end of the compiler typically translates the source code statements into one or more lower level intermediate language instructions. The back end of the compiler then takes this intermediate language program and translates it into a machine language program that the computer's processor understands.

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Lifetimes of Program Variables

For purposes of this invention, a "lifetime" of a program variable is a set of instructions that operate with that variable, either by "defining" the variable (i.e., by assigning it a value), or by "using" the variable (i.e., by reading the current value of the variable and using the current value in a computation). The lifetime contains a single defining instruction, and zero or more subsequent instructions that use the value stored by the defining instruction. Other instructions that neither define nor use the variable may be interspersed with the instructions belonging to the lifetime, but these interspersed instructions are not considered part of the lifetime of the variable. Note that the concept of lifetime herein is simplified to illustrate the concepts of the present invention. For example, a lifetime could include multiple definitions of a program variable. Those skilled in the art are familiar with the concept of lifetimes, and the simplified definition used herein shall not be construed as limiting the application of the present invention.

One common way to calculate the lifetime of a program variable determines all the definitions of the variable in the computer program, determines all the uses of the variable, and creates def-use chains between all uses reached by each definition and creates use-def chains between each use and all definitions that reach the use. The creation of def-use and use-def chains is well-known in the art, as discussed in Aho et al., *Compilers: Principles, Techniques and Tools*, section 10.5, p. 621 and section 10.6, pp. 632–33 (March 1988).

Optimization

Most compilers perform some optimizations on the program to make it run faster. These optimizations can improve a program's performance, but they must not change the function that it performs. Two different types of optimizations may be performed: machine-independent optimizations, and machine-dependent optimizations. Many known compilers perform both types of optimizations. Machine-independent optimizations are typically performed on the source code or intermediate code instruction streams. Machine-dependent optimizations are typically performed either directly on object code or on an intermediate code instruction stream that is very close to object code.

The compiler itself can perform optimizations or they may be performed by a separate computer program. Optimizations can take on many forms. Some examples of optimizations are: eliminating common subexpressions, eliminating dead code, using registers more efficiently, optimizing loops, instruction scheduling, and hoisting loop-invariant computations out of loops.

Example of Prior Art Hoisting

The examples herein use a representation of a computer program known as a "control flow graph". A control flow graph is a graph that represents the structure and flow of a computer program by interconnecting basic blocks. The term "basic block" is well known in the art, and represents a maximal sequence of straight-line code.

Figure 2:
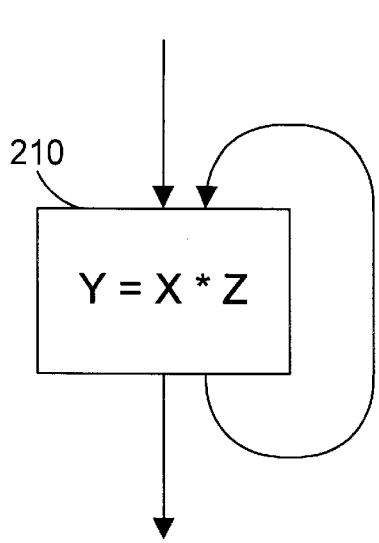
FIG. 2 is a control flow graph of a sample loop for illustrating the concept of hoisting a computation from the loop.

Referring to FIG. 2, a portion of a control flow graph is represented that includes a single basic block 210. This basic block includes a multiply instruction Y=X*Z. The portion of this instruction to the right of the assignment operator (=), namely X*Z, is referred to as the "computation"; the portion to the left of the assignment operator contains definitions of resources that constitute "side effects" of the instruction. Since the values of X and Z do not change within the loop, the computation X*Z is said to be "loop-invariant", which means that the result of the computation does not change regardless of how many times the instruction is executed. As a result, if the computation were moved out of the loop to precede the loop, the time-consuming multiply computation would only have to be performed once rather than each time the loop is executed.

Figure 4:
FIG. 4 is a flow diagram of a prior art method for hoisting computations from a loop.

Referring to FIG. 4, a prior art method 400 for hoisting loop-invariant computations out of loops begins by considering each appropriate loop in the computer program, from inner to outer loop (step 410). Then for each candidate instruction I in the loop (step 420), method 400 determines whether the computation in instruction I is loop-invariant and can be legally hoisted, and if so, it hoists the computation out of the loop (step 430).

Figure 3:
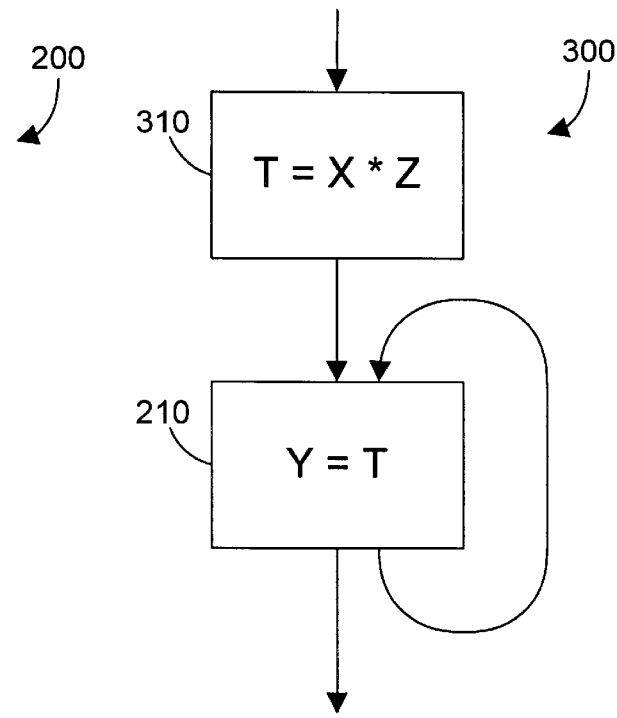
FIG. 3 is a control flow graph that shows how a prior art method hoists computations from the loop of FIG. 2.

The prior art process of hoisting a computation out of the loop of FIG. 2 is illustrated in the control flow graph of FIG. 3. We assume that the loop of basic block 210 of FIG. 2 is considered in step 410, and that the multiply instruction Y=X*Z has been selected as a potential hoisting candidate in step 420. Because the multiply computation in this instruction is loop-invariant, it needs to be hoisted out of the loop in step 430. This is accomplished by creating a temporary variable, assigning the temporary variable to hold the results of the computation outside of the loop, and performing a simple copy from the temporary variable into the original variable. Thus, for the multiply instruction of FIG. 2, the right-hand side of the multiply instruction is moved out of the loop into basic block 310 and is assigned to a new temporary variable T. Note that block 310 may be a new basic block created for hoisting, or block 310 could be a block that naturally precedes block 210 in the computer program. In either case, block 310 is known as a "preheader" block because it precedes the first block of a loop, which is known as the loop's header. The multiply instruction in the loop (in basic block 210) is then replaced with a copy from T to Y. In this manner, the time-consuming multiply computation is moved out of the loop and is executed once, while the simple and fast copy instruction is executed in the loop. This process of hoisting loop-invariant computations out of loops gives the computer program better performance.

One problem that arises when attempting to hoist computations out of loops according to the prior art method 400 of FIG. 4 is that sometimes certain instructions have side-effects that will not allow their computations to be hoisted out of the loop. For example, the program portion represented in the control flow graph of FIG. 5 includes a basic block 530 and a basic block 540 that both have instructions with side effects that prevent hoisting. These side effects affect a fixed processor register XER and therefore prevent the computations from being hoisted outside of the loop. Another fixed processor register, CR0, has a similar effect on hoisting.

The XER and CR0 registers are fixed registers in the processor's register set that perform special and unique functions. The XER is a single register that reflects the status resulting from certain instructions. The CR0 instruction is a single-condition register that is used by certain instructions to indicate whether or not an instruction has caused certain conditions to occur. Both the XER and CR0 are registers that are modified by certain instructions in the instruction set of the PowerPC processor. Note, however, that many processors and computer architectures include these and other types of fixed processor registers that are dedicated to specific functions. For the purpose of the discussion herein, we use the terms "bottleneck register" and "fixed processor register" interchangeably. Both of these terms describe a "fixed processor resource", which may include any fixed resource in the processor or available to the processor, whether now known or developed in the future. A bottleneck or fixed processor register typically applies to single processor registers that have specific functions, such as XER and CR0.

The problem in attempting to hoist instructions that have side effects on XER and CR0 is that there is no "temporary" register to hold the result, and no copy instruction from the temporary register to the original register. Because the XER and CR0 registers are singular resources, rather than each being in a set of resources, there is no other resource that can hold a copy. We therefore refer to instructions that have side effects on such registers as not independently hoistable.

Referring again to FIG. 5, an explanation of control flow graph 500 of FIG. 5 will help to understand the deficiencies in the prior art hoisting method. Instruction 532 is a special compare instruction known as a "compare immediate" instruction that compares general purpose register b (GPRb) with zero, and stores the result in condition register a (CRa) and the XER register. Instruction 542 is a similar instruction that compares general purpose register e (GPRe) with zero, and stores the result in condition register d (CRd) and the XER register. Instruction 534 is a special select instruction known as a "select immediate immediate" instruction that assigns one of two immediate arguments, a zero or one in this specific instance, to general purpose register c (GPRc) based on the value of the XER register. In similar fashion, instruction 544 assigns a zero or one to general purpose register f (GPRf) depending on the value of the XER register.

Figure 5:
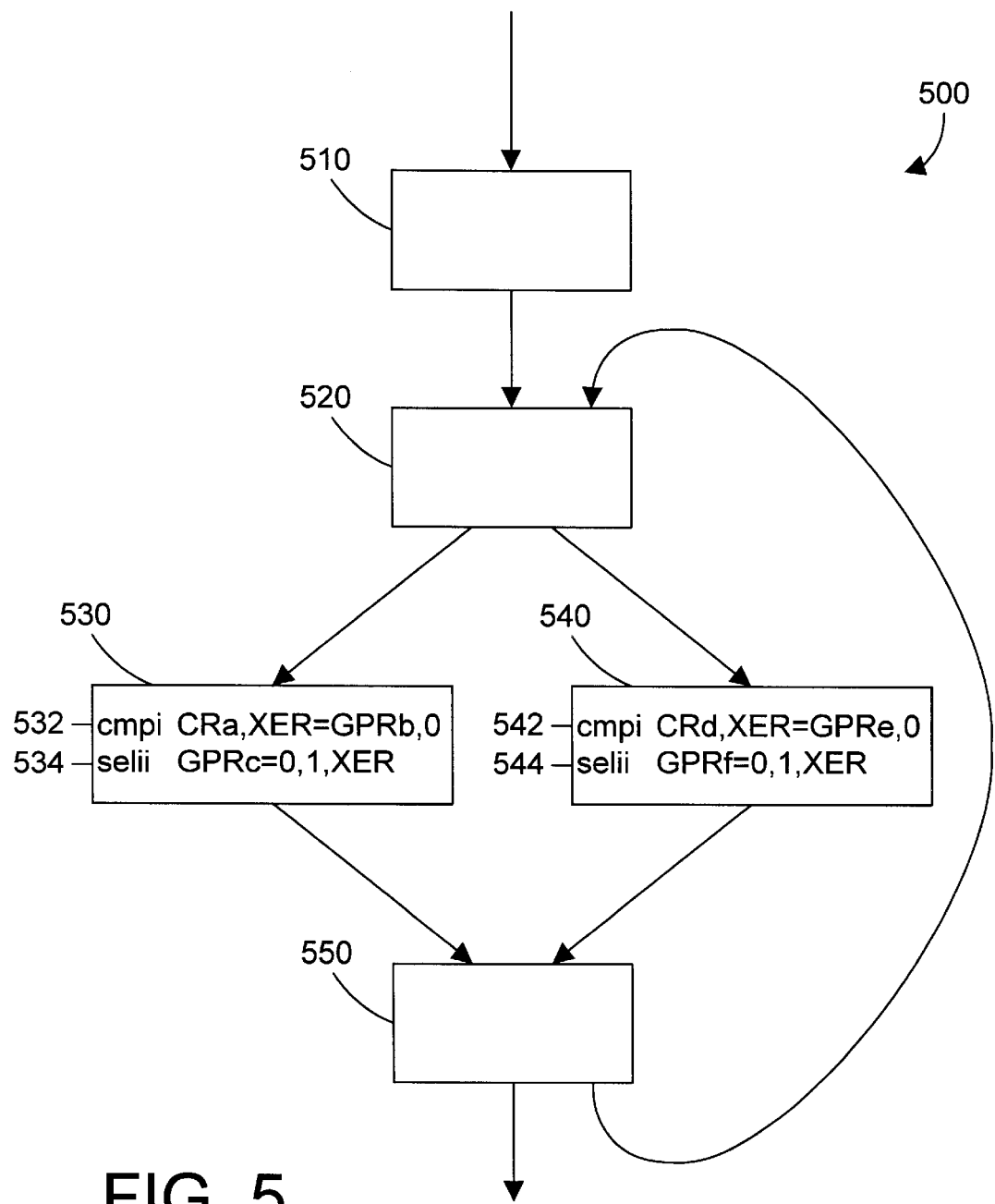
FIG. 5 is a control flow graph of a sample portion of a computer program.
Figure 6:
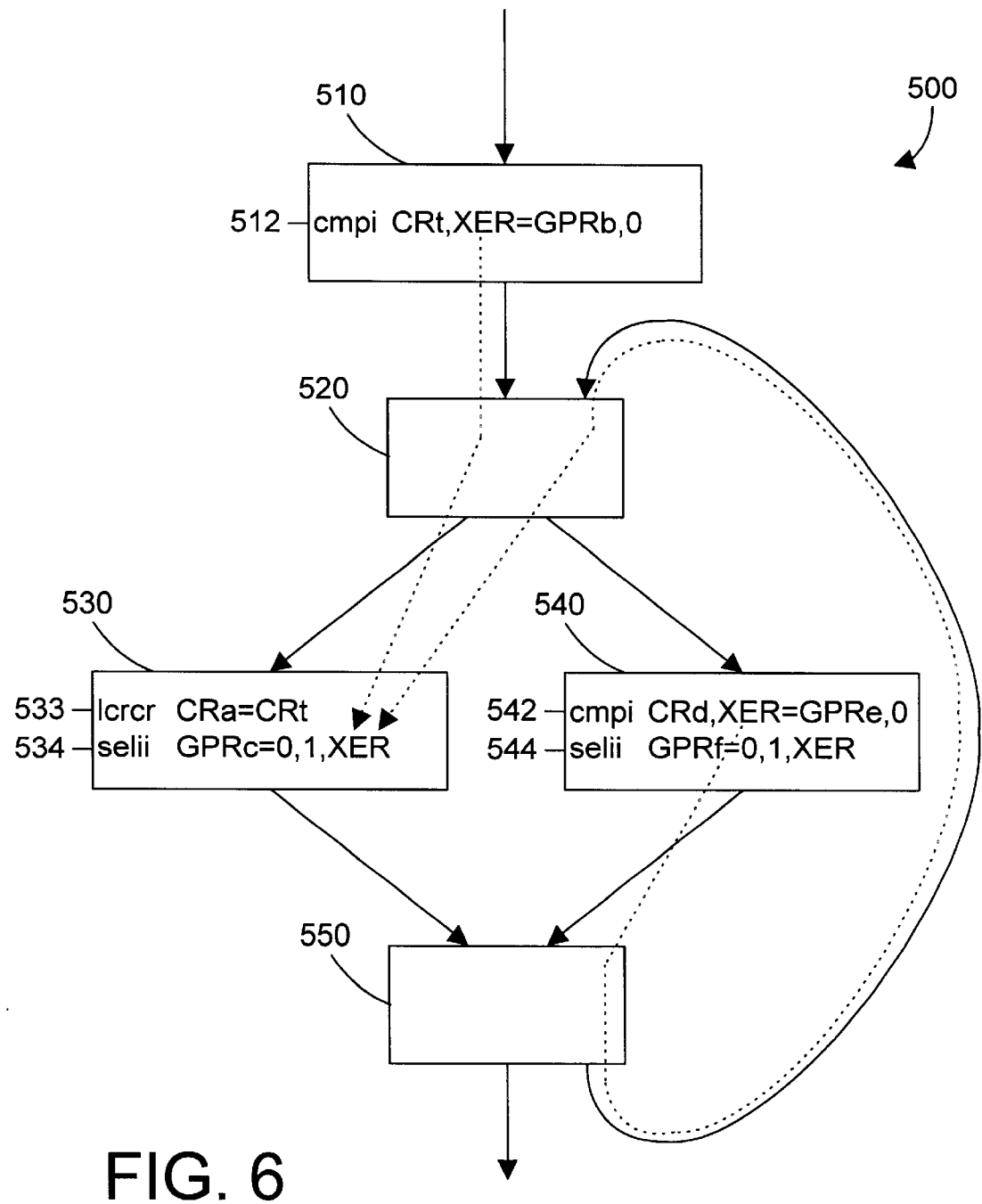
FIG. 6 is a control flow graph that illustrates the problem that would result if a single computation were hoisted from block 530 of FIG. 5 to block 510 of FIG. 6.
Figure 9:
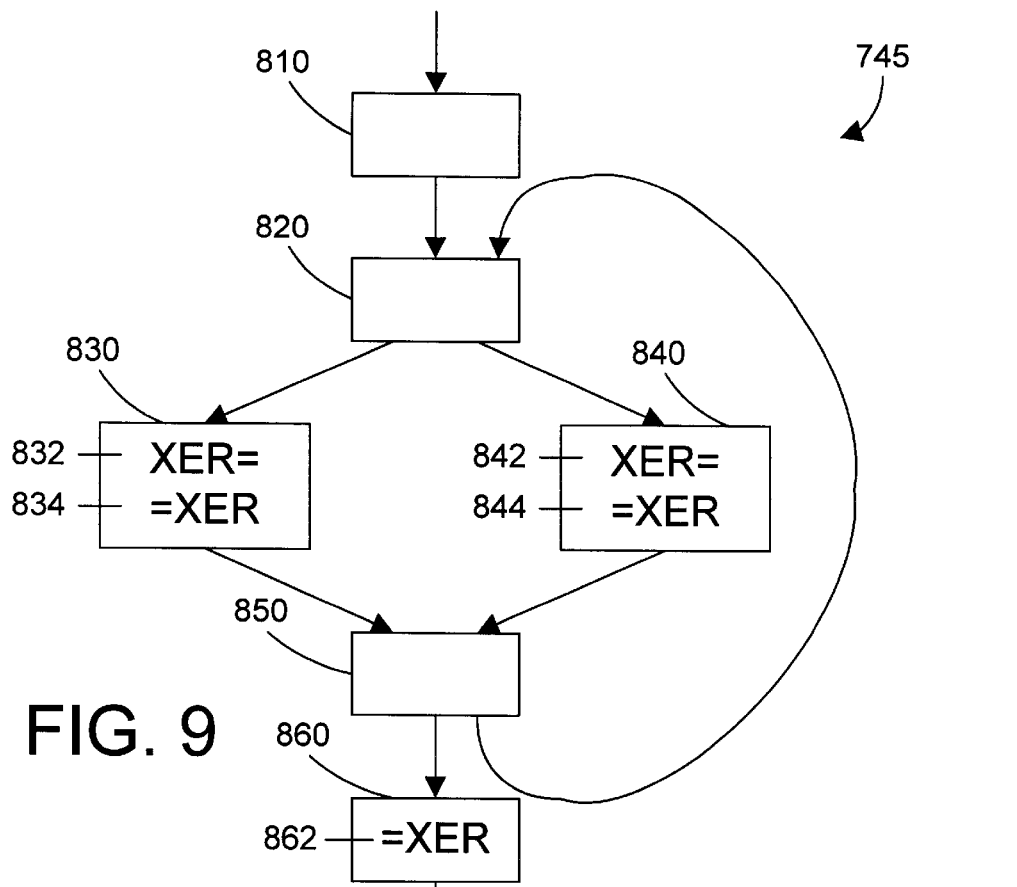
FIG. 9 is a control flow graph showing an example of a program configuration that would violate a hoisting criterion 745 of FIG. 7.
Figure 10:
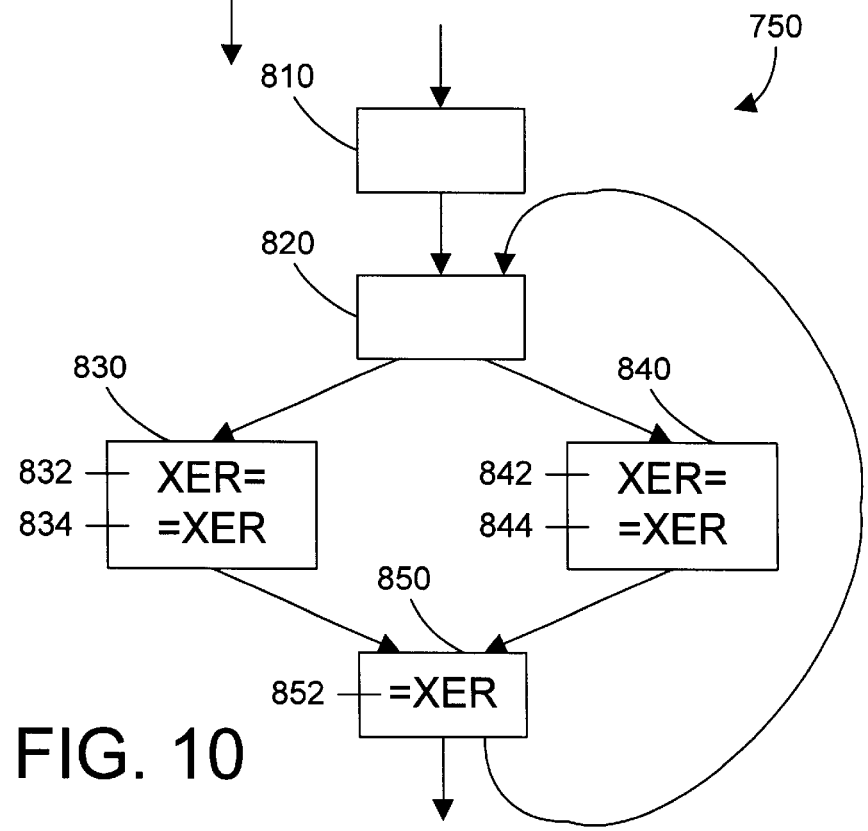
FIG. 10 is a control flow graph showing an example of a program configuration that would violate a hoisting criterion 750 of FIG. 7.
Figure 11:
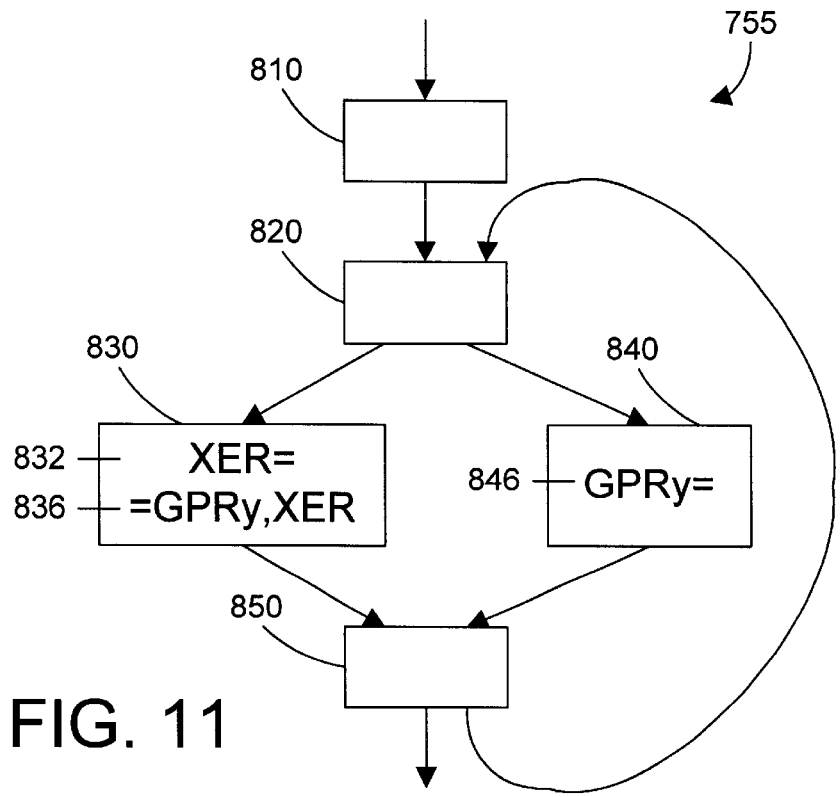
FIG. 11 is a control flow graph showing an example of a program configuration that would violate a hoisting criterion 755 of FIG. 7.
Figure 12:
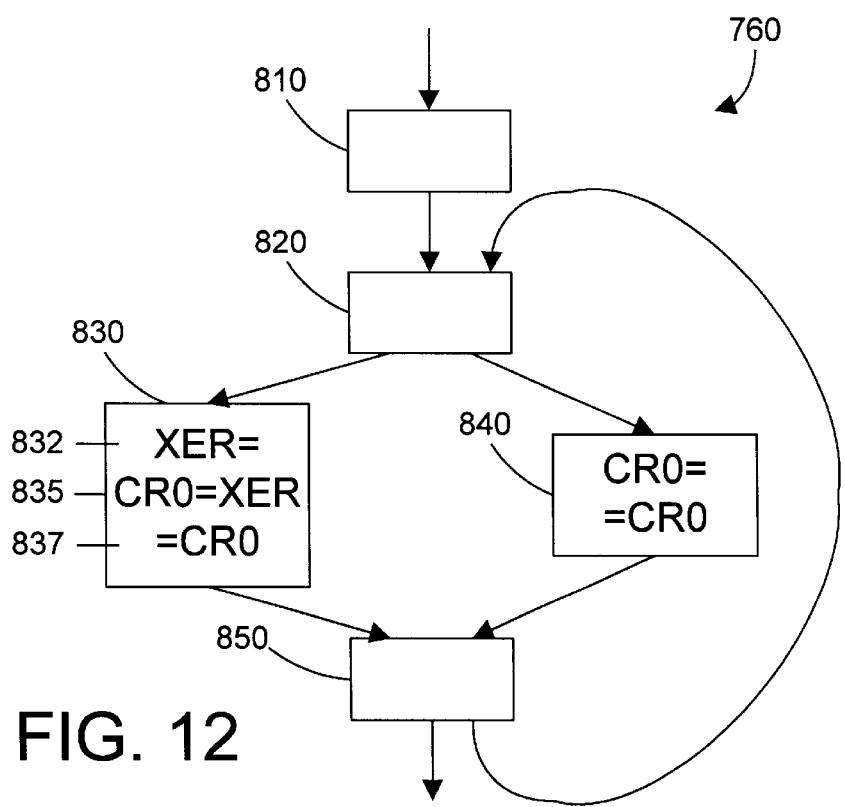
FIG. 12 is a control flow graph showing an example of a program configuration that illustrates a hoisting criterion 760 of FIG. 7.

FIG. 6 depicts graphically why the prior art method 400 considers the computation in instruction 532 illegal to hoist from the loop in FIG. 5. A key point is that the prior art examines one instruction at a time, and hoists the computation in the instruction if it is loop-invariant and hoistable. As shown in FIG. 6, if the computation in instruction 532 were hoisted from the loop by putting a compare instruction 512 in the preheader block 510 and a copy instruction 533 in the place of the compare instruction in block 530, the use of XER in instruction 534 would have two definitions that reach the use, as shown by the dotted lines. The definition of XER in instruction 512 and the definition of XER in instruction 542 both reach the use of XER in instruction 534, so the value in XER when instruction 534 is executed could be due to the execution of either instruction 512 or 542. As a result, method 400 determines that the computation in instruction 532 is not hoistable. The same is true for instruction 542 in block 540.

2. Detailed Description of the Preferred Embodiments

A hoisting mechanism and method in accordance with the preferred embodiments hoists computations out of loops by considering groups of computations, not single computations that, taken alone, are not hoistable. An instruction with a computation that is not hoistable by itself may be hoistable when a group of computations are considered for hoisting at the same time. The hoisting mechanism in accordance with the present invention looks at a first computation, and if the first computation is not hoistable, it considers other computations within the lifetime of fixed processor registers defined by the first instruction. If the group of computations taken together are hoistable, they are all hoisted out of the loop together.

Referring to FIG. 1, a computer system 100 in accordance with the preferred embodiment is an IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, a computer program 126, and an optimizing compiler 128 that includes a lifetime-sensitive hoisting mechanism 129 in accordance with the preferred embodiments. While the best mode of the invention has lifetime-sensitive hoisting mechanism 129 within optimizing compiler 128, it is equally within the scope of the present invention to provide lifetime-sensitive hoisting mechanism 129 separate from any compiler. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, computer program .126, optimizing compiler 128, and lifetime-sensitive hoisting mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 126 represents a computer program in any form, whether source code, intermediate language, machine code, or other forms. Computer program 126 may include system programs (e.g., an operating system), application programs, or any other types and forms of computer programs.

Processor 110 may be constructed from one or more microprocessors and/or integrated circuits, and includes a set of registers 112, which includes one or more fixed processor registers. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of computer program 126 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

The remainder of this specification describes the details of lifetime-sensitive hoisting mechanism 129 in FIG. 1. We assume for the discussion herein that the relevant portion of a computer program to be analyzed has been defined, and can include a few basic blocks, any or all of the basic blocks in a procedure or routine, or any or all of the basic blocks in the entire computer program. Whatever the size, we refer to this portion of the code as the "relevant range". Referring to FIG. 7, a method 700 in accordance with a preferred embodiment starts by calculating liveness for all bottleneck registers in the relevant range (step 705). Liveness is a concept that is well-known in the art, as described in Aho et al., *Compilers: Principles, Techniques and Tools*, section 10.6, pp. 631–32 (March 1988).

Next, the def-use and use-def chains for the bottleneck registers are determined (step 710). Then, for each appropriate loop in the relevant range (step 715), and for each candidate instruction I in the loop (step 720), method 700 first determines whether the computation in instruction I is loop-invariant and has no side effect on a bottleneck register (step 725). If so, method 700 hoists the computation in instruction I out of the loop, as with prior art method 400 of FIG. 4. If the computation in instruction I is loop-invariant, but I has a side effect on a bottleneck register (step 730), then method 700 uses the def-use chains and use-def chains calculated in step 710 to determine whether instruction I meets several hoisting criteria in steps 740–760. If all of these hoisting criteria are met, method 700 hoists I and all of the instructions within the lifetime of the bottleneck register defined in I out of the loop as a group. Method 700 is therefore "lifetime-sensitive" by determining whether a group of instructions within a lifetime of a bottleneck register have computations that may be hoisted as a group out of the loop. If any of these hoisting criteria 740–760 are not met, instruction I is rejected as a hoisting candidate, and no hoisting is done.

The hoisting criteria 740–760 define different conditions that will cause an instruction that is a hoisting candidate to be rejected for hoisting. Hoisting criterion 740 looks at whether the bottleneck register defined by instruction I is live on entry to the loop. A bottleneck register is "live on entry" to a basic block if there is a possible execution path to a use from the beginning of the block along which there is no intervening definition. An example of this condition is shown in the control flow graph of FIG. 8. Note that for the control flow graphs of FIGS. 8–12, a definition of the XER is represented as XER=, while a use of XER is represented as =XER. This nomenclature makes it easier to spot the defs and uses rather than using actual instructions. One skilled in the art will recognize that a definition of XER represented by XER= may be any instruction that defines XER. Similarly, a use of XER represented by =XER may be any instruction that uses XER.

For the control flow graph of FIG. 8, we assume that instruction 832 is the hoisting candidate, that the computation in instruction 832 is loop-invariant, and that instruction 832 has a side effect on XER. XER is defined in block 810, and is used in block 820, which is the header to the loop. Thus, XER is live on entry to the loop, and the instruction 832 would be rejected for hoisting by hoisting criterion 740.

A second hoisting criterion 745 determines whether any reached use of the bottleneck register is outside the loop containing I, and if so, instruction I is rejected for hoisting. This condition is illustrated in the control flow graph of FIG. 9. Again, we assume that instruction 832 is the hoisting candidate, that the computation in instruction 832 is loop-invariant, and that instruction 832 has a side effect on XER. The definition of XER in instruction 832 has two reached uses, one in instruction 834 and the other in instruction 862. Block 860 that contains instruction 862 is outside of the loop. Of the definitions of XER in instructions 832 and 842, the last one executed will feed the value of XER to the use in instruction 862, so hoisting the computation in instruction 832 out of the loop would produce erroneous results. Because the use of XER in instruction 862 is outside of the loop, instruction 832 is rejected for hoisting according to hoisting criterion 745.

A third hoisting criterion 750 determines whether any reached use of the bottleneck register is reached by a definition other than the definition in I, and if so, I is rejected for hoisting. This condition is illustrated in the control flow graph of FIG. 10. Again, we assume that instruction 832 is the hoisting candidate, that the computation in instruction 832 is loop-invariant, and that instruction 832 has a side effect on XER. The definition of XER in instruction 832 has two reached uses, one in instruction 834 and another in instruction 852. The use in instruction 852 is also reached by the definition of XER in instruction 842. Thus, the definition executed last (of instructions 832 and 842) will determine the value of XER that is used in instruction 852, so hoisting the computation in instruction 832 out of the loop would produce erroneous results. Because the use of XER in instruction 852 is reached by a definition of XER other than the definition in instruction 832 (i.e., in instruction 842), instruction 832 is rejected for hoisting according to hoisting criterion 750.

A fourth hoisting criterion 755 determines whether there is any reached use of the bottleneck register that is not loop-invariant, and if so, the instruction is rejected for hoisting. This condition is illustrated in the control flow graph of FIG. 11. Again, we assume that instruction 832 is the hoisting candidate, that the computation in instruction 832 is loop-invariant, and that instruction 832 has a side effect on XER. The definition of XER in instruction 832 has a reached use in instruction 836. However, the instruction 836 that uses XER also uses general purpose register y (GPRy), which is defined in instruction 846 in block 840. Because GPRy is defined in one path of the loop and used in a different path, the instructions that define and use GPRy are not loop-invariant, because the execution of the loop may change the value of GPRy used in instruction 836.

Because the computation in instruction 836, which has a reached use of XER, is not loop-invariant, instruction 832 is rejected for hoisting according to hoisting criterion 755.

A fifth hoisting criterion 760 recognizes that if an instruction that has a reached use of a first bottleneck register defines a second bottleneck register, all of the hoisting criteria must be satisfied for all the reached uses of the second bottleneck register. Thus, method 700 has a transitive nature that allows a determination regarding whether a group of computations may all be hoisted out of the loop together. This condition is illustrated by the control flow graph of FIG. 12. Again, we assume that instruction 832 is the hoisting candidate, that the computation in instruction 832 is loop-invariant, and that instruction 832 has a side effect on XER. While all of the hoisting criteria are met with respect to XER, the reached use of XER in instruction 835 also defines another bottleneck register CR0, so the analysis must be repeated to determine whether the instruction 835 that defines CR0 meets all the hoisting criteria. For the example illustrated in FIG. 12, instruction 835 also meets all the hoisting criteria, so instructions 832, 835 and 837 would all be hoisted out of the loop together.

Figure 13:
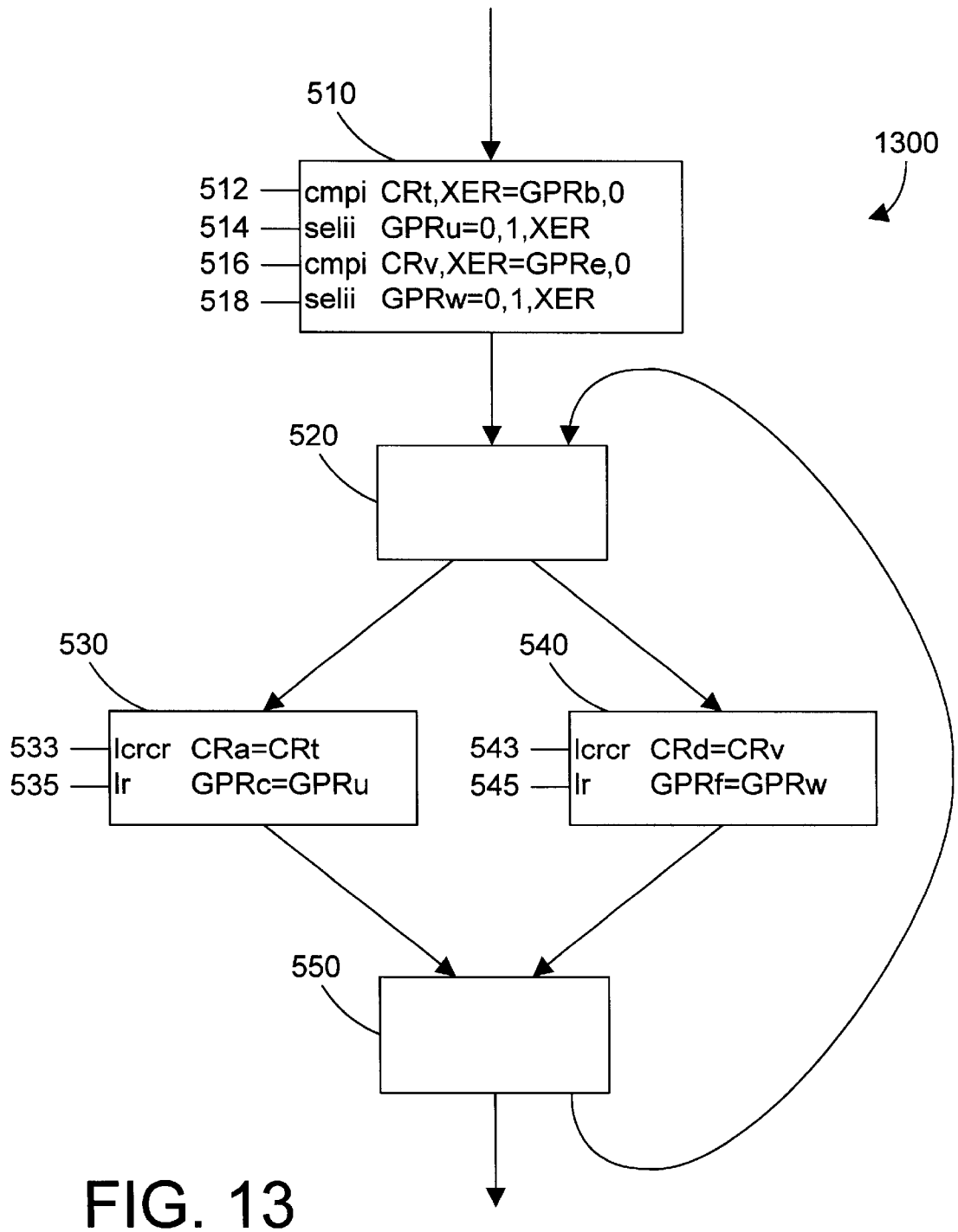
FIG. 13 is a control flow graph of the computer program of FIG. 5 after hoisting the loop-invariant groups of computations from the loop in accordance with the preferred embodiment.

The control flow graph 1300 of FIG. 13 represents the computer program in FIG. 5 after hoisting computations from the loop in accordance with the method 700 of FIG. 7. Referring to FIGS. 5 and 7, method 700 begins by calculating liveness for all bottleneck registers (step 705). In the portion of the computer program in FIG. 5, there is only one bottleneck register defined, XER. XER is defined in instruction 532 and is used in instruction 534, and is also defined in instruction 542 and is used in instruction 544. Thus, XER is live within blocks 530 and 540, but nowhere else. Next, method 700 calculates def-use and use-def chains for XER (step 710). Instruction 532 has one entry on its def-use chain, namely instruction 534. Instruction 534 has one entry on its use-def chain, namely instruction 532. In similar fashion, instruction 542 has one entry on its def-use chain, namely instruction 544, and instruction 544 has one entry on its use-def chain, namely instruction 542.

Step 715 selects the only loop in FIG. 5, and step 720 begins by arbitrarily selecting instruction 532 as the first candidate instruction I for hoisting. For the reasons shown in FIG. 6, step 725 determines that instruction 532 has a side effect on XER, so instruction I is not hoisted out yet. Step 730 then determines that the computation in instruction 532 is loop-invariant, so it then determines all the reached uses of XER from instruction 532 (step 735). It then determines whether all of the hoisting criteria 740–760 are satisfied. Step 740 determines that XER is not live on entry to the loop. Step 745 determines that there is no reached use of XER outside of the loop. Step 750 determines that there is no reached use of XER that is also reached by a definition other than in instruction 532. Step 755 determines that the reached use of XER, namely the computation in instruction 534, is loop-invariant if definitions of XER in the loop are ignored. Step 760 determines that the reached use of XER, instruction 534, does not define any other bottleneck registers. Because all of hoisting criteria 740–760 are satisfied, the entire lifetime of XER, meaning instructions 532 and 534, are hoisted together out of the loop. Referring to FIG. 13, this hoisting is performed by placing equivalent instructions 512 and 514 in preheader block 510, and by then putting copy instructions 533 and 535 in the place of original instructions 532 and 534, respectively. Thus, the compare instruction is performed in instruction 512 with the result stored in condition register t (CRt). Condition register t (CRt) is then copied to CRa using the lcrcr command (load condition register to condition register) in instruction 533. The select instruction is performed in instruction 514 with the result stored in general purpose register u (GPRu). Then, GPRu is copied to general purpose register c (GPRc) using the lr command (load register) in instruction 535. In this manner, instructions 532 and 534 of FIG. 5 have been hoisted out of the loop as a group as instructions 512 and 514, with the corresponding copy instructions 533 and 535 replacing the original instructions in block 530.

Method 700 then returns to step 720 and selects the next candidate instruction 542. Method 700 follows the same steps 725–760 to determine that the computation in instruction 542 may be hoisted out of the loop with its reached uses, and performs the hoisting of computations in instructions 542 and 544 as a group in step 765. The result is instructions 516 and 518 in the preheader block 510, along with corresponding copy instructions 543 and 545 in block 540. Note that the order of groups of instructions is important, but the order among different groups of instructions corresponding to computations that have been hoisted to the preheader block 510 is not important. Thus, instructions 512 and 514 must be kept together (i.e., with no instructions interleaved between them), and instructions 516 and 518 must be kept together, but these two groups of instructions may occur in any order within block 510. In other words, an equivalent ordering of instructions in block 510 would be 516, 518, 512, and 514.

The present invention is an improvement over the prior art by recognizing that groups of computations may be hoistable while an individual computation taken alone may not be. By viewing groups of instructions within the lifetime of a fixed processor register, the present invention hoists groups of computations outside of loops, thereby improving the performance of the computer program.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a computer program residing in the memory; and
   a hoisting mechanism residing in the memory and executed by the at least one processor, the hoisting mechanism analyzing an instruction within a loop in the computer program, calculating a lifetime of at least one fixed processor resource defined by the instruction, and determining whether a computation in the instruction may be hoisted out of the loop along with a computation in at least one other instruction in the lifetime of the at least one fixed processor resource according to at least one hoisting criterion wherein the hoisting mechanism optimizes the computer program by reducing the number of instructions in the loop.

2. The apparatus of claim 1 wherein the at least one hoisting criterion specifies that the computation be hoisted out of the loop if:
   (A) the computation is loop-invariant and the instruction has no side effects on any fixed processor resource.

3. A The apparatus of claim 2 wherein the at least one hoisting criterion further specifies that the computation be hoisted out of the loop if:
   (B) the computation is loop-invariant, the instruction has a side effect on a fixed processor resource, and none of the following are true:
      (B1) the fixed processor resource is live on entry to the loop;
      (B2) any reached use of the fixed processor resource is outside the loop containing the instruction;
      (B3) any reached use of the fixed processor resource is reached by a definition of the fixed processor resource other than the definition in the instruction; and
      (B4) any reached use is not loop-invariant, ignoring definitions of the fixed processor resource in the loop.

4. The apparatus of claim 3 wherein the at least one hoisting criterion further specifies that the computation be hoisted out of the loop if none of steps B1–B4 are true for all definitions of fixed processor resources in all reached uses of the fixed processor resource in the instruction.

5. A method for analyzing a plurality of instructions in a computer program for potential hoisting of computations out of loops, the method comprising the steps of:
   analyzing an instruction within a loop in the computer program;
   calculating a lifetime of at least one fixed processor resource defined by the instruction; and
   determining whether a computation in the instruction may be hoisted out of the loop along with a computation in at least one other instruction in the lifetime of the at least one fixed processor resource according to at least one hoisting criterion wherein hoisting optimizes the computer program by reducing the number of instructions in the loop.

6. The method of claim 5 wherein the at least one hoisting criterion specifies that the computation be hoisted out of the loop if:
   (A) the computation is loop-invariant and the instruction has no side effects on any fixed processor resource.

7. The method of claim 6 wherein the at least one hoisting criterion further specifies that the computation be hoisted out of the loop if:
   (B) the computation is loop-invariant, the instruction has a side effect on a fixed processor resource, and none of the following are true:
      (B1) the fixed processor resource is live on entry to the loop;
      (B2) any reached use of the fixed processor resource is outside the loop containing the instruction;
      (B3) any reached use of the fixed processor resource is reached by a definition of the fixed processor resource other than the definition in the instruction; and
      (B4) any reached use is not loop-invariant, ignoring definitions of the fixed processor resource in the loop.

8. The method of claim 7 wherein the at least one hoisting criterion further specifies that the computation be hoisted out of the loop if none of steps B1–B4 are true for all definitions of fixed processor resources in all reached uses of the fixed processor resource in the instruction.

9. A method for analyzing a plurality of instructions in a computer program for potential hoisting of computations out of loops, the method comprising the steps of:
   for each instruction I in a loop in the computer program:
      (A) if a computation in I is loop-invariant and I has no side effects on a fixed processor resource, then hoist the computation in instruction I out of the loop;

(B) if the computation in I is loop-invariant, but I has a side effect on a fixed processor resource, then:
  (B1) determine all reached uses of the fixed processor resource from instruction I;
  (B2) if the fixed processor resource is live on entry to the loop, do not hoist the computation in I out of the loop;
  (B3) if any reached use is outside the loop containing I, do not hoist the computation in I out of the loop;
  (B4) if any reached use is also reached by a definition of the fixed processor resource other than I, do not hoist the computation in I out of the loop;
  (B5) if any reached use is not loop-invariant, ignoring definitions of the fixed processor resource in the loop, do not hoist the computation in I out of the loop;
  (B6) repeat steps B1–B5 above for any fixed processor resource defined on any reached use;
  (B7) otherwise, hoist the computation in I and computations in all of the reached uses of I out of the loop;
wherein the hoisting of computations out of the loop optimizes the computer program by reducing the number of instructions in the loop.

10. A program product comprising:
(A) a hoisting mechanism analyzing an instruction within a loop in a computer program, calculating a lifetime of at least one fixed processor resource defined by the instruction, and determining whether a computation in the instruction may be hoisted out of the loop along with a computation in at least one other instruction in the lifetime of the at least one fixed processor resource according to at least one hoisting criterion, wherein the hoisting mechanism optimizes the computer program by reducing the number of instructions in the loop; and
(B) signal bearing media bearing the hoisting mechanism.

11. The program product of claim 10 wherein the signal bearing media comprises recordable media.

12. The program product of claim 10 wherein the signal bearing media comprises transmission media.

13. The program product of claim 10 wherein the at least one hoisting criterion specifies that the computation be hoisted out of the loop if:
(A) the computation is loop-invariant and the instruction has no side effects on any fixed processor resource.

14. The program product of claim 13 wherein the at least one hoisting criterion further specifies that the computation be hoisted out of the loop if:
(B) the computation is loop-invariant, the instruction has a side effect on a fixed processor resource, and none of the following are true:
  (B1) the fixed processor resource is live on entry to the loop;
  (B2) any reached use of the fixed processor resource is outside the loop containing the instruction;
  (B3) any reached use of the fixed processor resource is reached by a definition of the fixed processor resource other than the definition in the instruction; and
  (B4) any reached use is not loop-invariant, ignoring definitions of the fixed processor resource in the loop.

15. The program product of claim 14 wherein the at least one hoisting criterion further specifies that the computation be hoisted out of the loop if none of steps B1–B4 are true for all definitions of fixed processor resources in all reached uses of the fixed processor resource in the instruction.

* * * * *